United States Patent [19]
Minami et al.

[11] Patent Number: 5,410,623
[45] Date of Patent: Apr. 25, 1995

[54] OPTICAL DEVICE HAVING TWO OPTICAL WAVEGUIDES CONNECTED AND A METHOD OF PRODUCING THE SAME

[75] Inventors: Kouji Minami, Gose; Kuniaki Okada, Tenri; Renzaburo Miki, Tenri; Hiroyuki Yamamoto, Tenri; Yoshio Yoshida, Nara; Yukio Kurata, Tenri, all of Japan

[73] Assignee: Sharp Kabushiki Kaisha, Osaka, Japan

[21] Appl. No.: 111,144

[22] Filed: Aug. 24, 1993

[30] Foreign Application Priority Data

Aug. 25, 1992 [JP] Japan ................... 4-226104

[51] Int. Cl.⁶ .................................. G02B 6/26
[52] U.S. Cl. .......................... 385/15; 385/27; 385/50; 385/29
[58] Field of Search .............. 385/15, 14, 27, 12, 385/13, 39, 37, 2, 31, 50

[56] References Cited

U.S. PATENT DOCUMENTS

| | | | |
|---|---|---|---|
| 3,957,341 | 5/1976 | Taylor | 385/27 |
| 5,015,052 | 5/1991 | Ridgway et al. | 385/2 |
| 5,285,509 | 2/1994 | Reeder et al. | 385/50 X |

FOREIGN PATENT DOCUMENTS

| | | |
|---|---|---|
| 2643756 | 8/1990 | France . |
| 2090056 | 6/1982 | United Kingdom . |

OTHER PUBLICATIONS

Capsalis, C. N., et al., "Theoretical analysis of a coated single-mode fiber termination" *International Journal of Infrared and Millimeter Waves* (1990) 11(9):1073–1097 Sep.

Naumann, S., "Bauelemente der Optik" C. Hanser Verlag, München, Wien, (1983) No Month pp. 72–73. A partial English translation is enclosed herewith.

Kamminga, W., et al., "Experiences with finite element calculations of waveguide coupling problems" *Optics Communications* (1990) 77(5,6):423–434 Jul.

J. Yamakita et al., "Analysis of discontinuities in dielectric waveguides using hypothetical periodicity" *The Transactions of the Institute of Electronics, Information and Communication Engineers* (Jul. 1991) vol. J74-C-I, No. 7, pp. 258–263.

*Primary Examiner*—Rodney B. Bovernick
*Assistant Examiner*—Phan Thiheartney Palmer
*Attorney, Agent, or Firm*—Morrison & Foerster

[57] ABSTRACT

An optical device includes: a first dielectric slab waveguide having an effective refractive index $N_1$; a second dielectric slab waveguide having an effective refractive index $N_2$; and a third dielectric slab waveguide having a length 1 and an effective refractive index $N_3$, the third dielectric slab waveguide being formed between the first dielectric slab waveguide and the second dielectric slab waveguide so as to connect the first dielectric slab waveguide with the second dielectric slab waveguides optically; wherein the length I and the effective refractive index $N_3$ substantially satisfy following equations;

$$N_3 = \sqrt{N_1 N_2}$$

$$l = \frac{\lambda}{4\sqrt{N_3^2 - N_1^2 \sin^2\theta}}$$

where $\lambda$ is a free-space wavelength of light traveling in the optical device and the light travels from the first dielectric slab waveguide to the third dielectric slab waveguide at an incident angle $\Theta$ in a single mode.

5 Claims, 7 Drawing Sheets

OPTICAL DEVICE HAVING TWO OPTICAL WAVEGUIDES CONNECTED AND A METHOD OF PRODUCING THE SAME

BACKGROUND OF THE INVENTION

1. Field of the Invention

The present invention relates to an optical device to connect dielectric slab waveguides having different refractive indices.

2. Description of the Related Art

Optical integration technology has been initially studied in an optical communications and is recently been explored for use in various other fields. An optical waveguide, which is a type of device produced using optical integration technology, can be combined with conventional optical components such as lenses, prisms, mirrors, etc. Such an optical waveguide combined with the conventional optical components is being considered for use as part of an optical Dick-up device. Also, it is proposed that an optical waveguide can be applied to a polarizing isolator to detect optomagnetic signals.

In polarizing isolators and other optical integrated apparatuses, dielectric slab waveguides having different effective refractive indices may be connected with each other. Direct connection of two dielectric slab waveguides having different effective refractive indices causes reflected waves at a boundary therebetween. Existence of such reflected waves can result in loss of a light power at the boundary.

Figure 5A:
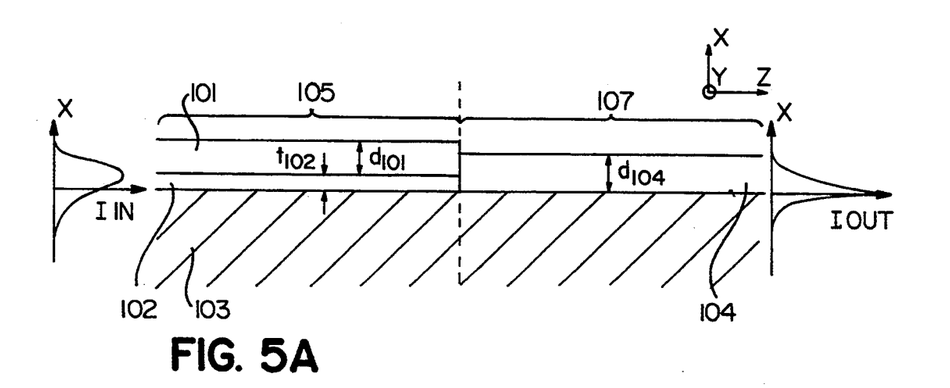
FIG. 5A is a schematic cross sectional view of an optical device in which two dielectric slab waveguides are butted together.
Figure 5B:
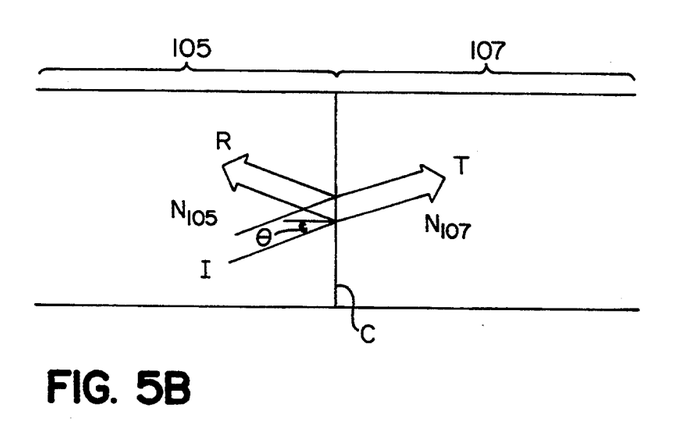
FIG. 5B is a schematic representation of a light path in the optical device shown in FIG. 5A.

A connection of two dielectric slab waveguides having different effective refractive indices is now explained. FIG. 5A shows that a dielectric slab waveguide 105 is directly connected with a dielectric slab waveguide 107. Both dielectric slab waveguides 105 and 107 propagate single mode light. The dielectric slab waveguide 105 includes a portion of a dielectric substrate 103, a dielectric layer 102 formed on the portion of the dielectric substrate 103, and a dielectric layer 101 formed on the dielectric layer 102. The dielectric layers 102 and 101 have thicknesses of $t_{102}$ and $d_{101}$, respectively. The dielectric slab waveguide 107 includes another portion of the substrate 103 and a dielectric layer 104 formed on the other portion of the substrate 103. The dielectric layer 104 has a thickness of $d_{104}$. As is represented in FIG. 5B, the dielectric slab waveguides 105 and 107 have effective refractive indices $N_{105}$ and $N_{107}$, respectively.

In the case where light I enters a boundary C between the dielectric slab waveguides 105 and 107 at an angle $\Theta$, a portion of the light I is transmitted through the boundary C into the dielectric slab waveguide 107 and another portion of light I is reflected at the boundary C. The reflected light portion designated by R is reflected away from the boundary C and returns back toward the dielectric slab waveguide 105. Thus, all of the light I is not propagated through the boundary C into the dielectric slab waveguide 107. This means that the transmission of light I loses part of the light power at the boundary C during traveling from the dielectric slab waveguide 105 to the dielectric slab waveguide 107. This is because that intensity distribution $I_{in}$ of the light in the dielectric slab waveguide 105 is different from intensity distribution $I_{out}$ of the light in the dielectric slab waveguide 107.

Figure 6A:
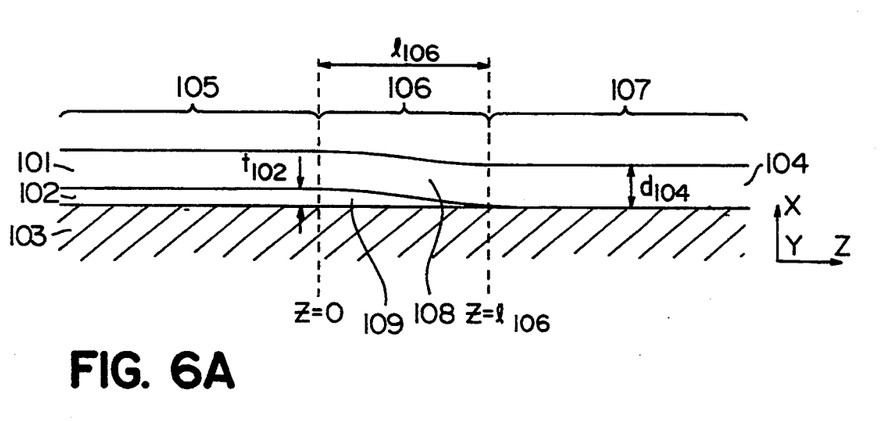
FIG. 6A is a schematic cross sectional view of an optical device according to a conventional technique.
Figure 6B:
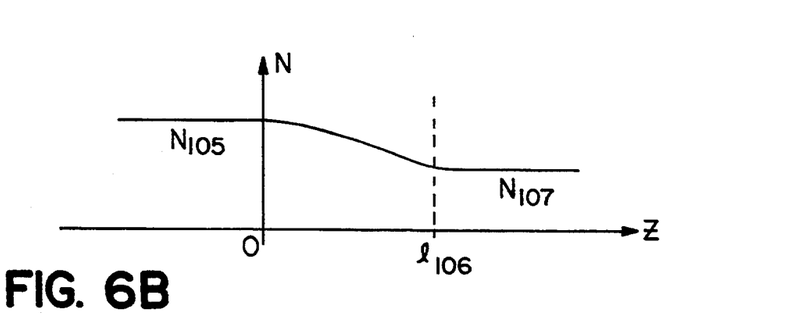
FIG. 6B illustrates a change of an effective refractive index in the optical device shown in FIG. 6A.

The loss of light power mentioned above is conventionally solved by forming a tapered layer 106 between the dielectric slab waveguide 105 and the dielectric slab waveguide 107, as is shown in FIG. 6A. The tapered layer 106 includes a dielectric layer 108, a dielectric layer 109, and a portion of the dielectric substrate 103 and has a length $1_{106}$. The layer 109 is formed in tapered shape which satisfies $t_{102}/1_{106} < 1/10$. As is shown in FIG. 6B, an effective refractive index N of the tapered layer 106 gradually changes in a z-axis direction. The tapered layer 106 enables gradual change of an intensity distribution of light incident on the tapered layer 106. The intensity distributions at $z=0$ and $z=1_{106}$ correspond to intensity distributions in the dielectric slab waveguides 105 and 107, respectively. Therefore, the dielectric slab waveguides 105 and 107 are connected with each other without loss of the light power.

Figure 7A:
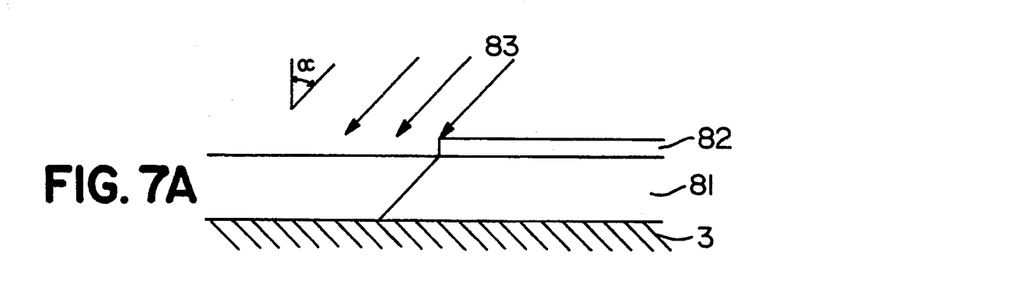
FIGS. 7A through 7C illustrate a method of producing a layer having a taper by a dry etching method.
Figure 7B:
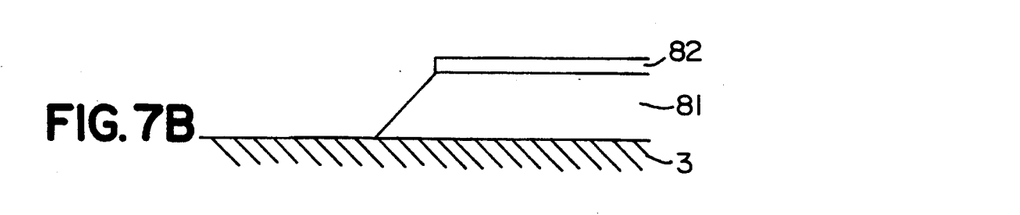
Figure 7C:
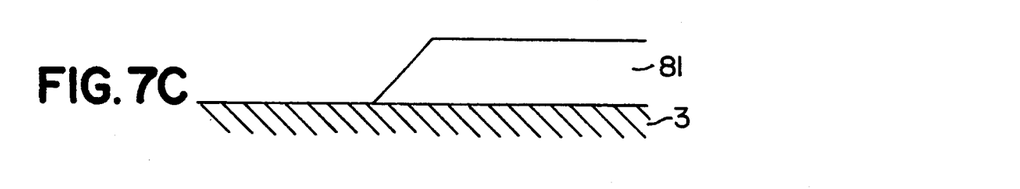

A tapered layer having a desired shape must be formed with accuracy so as to connect two dielectric slab waveguides by the aforementioned method. However, it is difficult to form a tapered layer having such a gradual slope. FIGS. 7A through 7C show a method of forming a layer with a gradual taper by a dry etching method utilized in a semiconductor manufacturing process. A layer 81 is formed on a substrate 3, and a resist pattern 82 is formed on the layer 81. An ion beam 83 is irradiated into the layer 81 at an irradiation angle $\alpha$. The layer 81 is etched using the resist pattern 82 as a mask. After the resist pattern 82 is removed, the layer 81 having a taper is formed. In this method, the angle of the taper depends on the irradiation angle $\alpha$ of the ion beam 83. However, in this method, it is difficult to irradiate the ion beam 83 into the layer 81 for large irradiation angles. Therefore, it is difficult to make a taper having a sufficiently gradual angle to be applied to practical use.

Figure 8A:
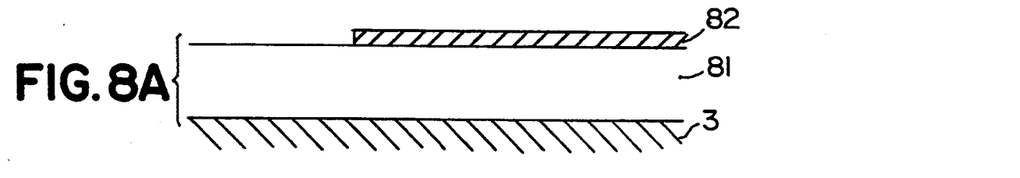
FIGS. 8A and 8B illustrate a method of producing a layer having a taper by a wet etching method.
Figure 8B:
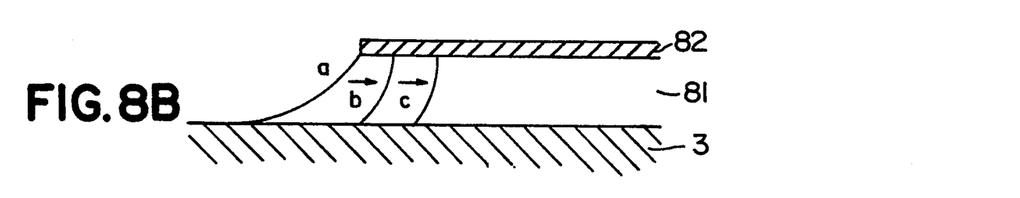

FIGS. 8A and 8B show a method of forming a layer with a gradual taper by a wet etching method. A layer 81 is formed on a substrate 3, and a resist pattern 82 is formed on the layer 81 as is shown in FIG. 8A. The layer 81 is then etched using the resist pattern 82 as a mask by a wet etching method. A part of the layer 81 under the resist pattern 82 is also etched according to a, b, and c, as is shown in FIG. 8B. The layer 81 has a desired profile by stopping etching at a proper time. Using this method, the shape of the taper depends on an etching rate. However, the etching rate is subject to changes of agitation, concentration and temperature of the etching solution as will be appreciated. Therefore, this method does not provide good repeatability. Also, it is difficult to form a gradual taper using the wet etching method.

As is described above, a tapered layer is utilized for connecting two dielectric slab waveguides having different effective refractive indices by a conventional technique. However, it is difficult to form the tapered layer with a gradual angle and to produce the layer with good repeatability. The present invention overcomes aforementioned shortcomings associated with such conventional techniques and provides an optical device to connect two dielectric slab waveguides having different effective refractive indices without loss of light power.

SUMMARY OF THE INVENTION

The optical device of this invention, includes: a first dielectric slab waveguide having an effective refractive index $N_1$; a second dielectric slab waveguide having an effective refractive index $N_2$; and a third dielectric slab waveguide having a length 1 and an effective refractive index $N_3$, the third dielectric slab waveguide being formed between the first dielectric slab waveguide and the second dielectric slab waveguide so as to connect the first dielectric slab waveguide with the second dielectric slab waveguides optically; wherein the length 1 and the effective refractive index $N_3$ substantially satisfy following equations;

$$N_3 = \sqrt{N_1 N_2}$$

$$l = \frac{\lambda}{4\sqrt{N_3^2 - N_1^2 \sin^2\theta}}$$

where $\lambda$ is a free-space wavelength of light traveling in the optical device and the light travels from the first dielectric slab waveguide to the third dielectric slab waveguide at an incident angle $\Theta$ in a single mode.

According to another aspect of the invention a method for producing an optical device is provided. The method includes the steps of: forming a first dielectric slab waveguide having an effective refractive index $N_1$; forming a second dielectric slab waveguide having an effective refractive index $N_2$; and forming a third dielectric slab waveguide having a length 1 and an effective refractive index $N_3$, the third dielectric slab waveguide being formed between the first dielectric slab waveguide and the second dielectric slab waveguide so as to connect the first dielectric slab waveguide with the second dielectric slab waveguides optically; wherein the length 1 and the effective refractive index $N_3$ substantially satisfy following equations;

$$N_3 = \sqrt{N_1 N_2}$$

$$l = \frac{\lambda}{4\sqrt{N_3^2 - N_1^2 \sin^2\theta}}$$

where $\lambda$ is a free-space wavelength of light traveling in the optical device and the light travels from the first dielectric slab waveguide to the third dielectric slab waveguide at an incident angle $\Theta$ in a single mode.

According to an optical device of the present invention, a third dielectric slab waveguide, through which two dielectric slab waveguides having different effective refractive indices are optically connected with each other, is formed as an antireflection film. Also, two dielectric slab waveguides can be connected without using a tapered layer.

Thus, the invention described herein makes possible the advantages of (1) providing an optical device in which two dielectric slab waveguides having different effective refractive indices are connected with each other without connection loss, (2) providing an optical device to connect two dielectric waveguides, which can be easily produced by conventional techniques, and (3) providing a method for producing the optical device.

These and other advantages of the present invention will become apparent to those skilled in the art upon reading and understanding the following detailed description with reference to the accompanying figures.

DESCRIPTION OF THE PREFERRED EMBODIMENTS

The present invention will be described by way of examples with reference to the drawings, wherein like reference numerals are used to refer to like elements throughout.

EXAMPLE 1

Figure 1A:
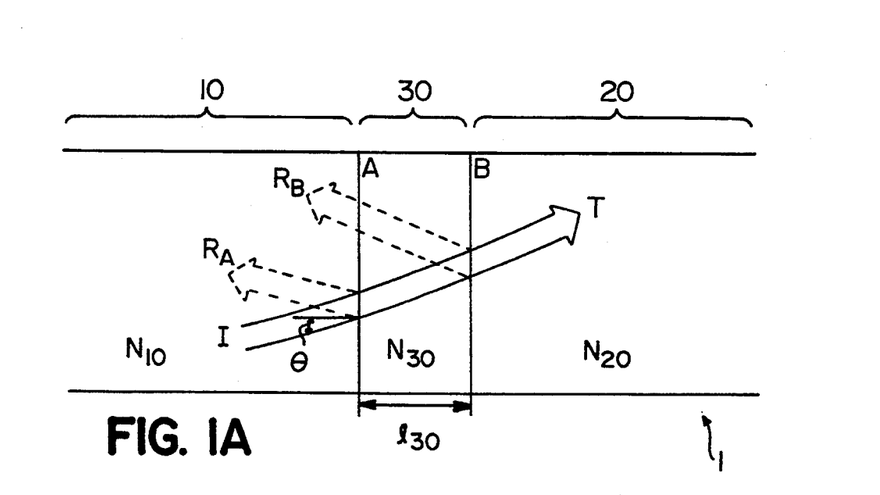
FIG. 1A is a schematic representation of a light path in an optical device in accordance with Example 1 of the present invention.

Referring initially to FIG. 1A, a light path in an optical device I of the present invention is now explained. The optical device I has a first dielectric slab waveguide 10, a second dielectric slab waveguide 20, and a third dielectric slab waveguide 30. The third dielectric slab waveguide 30 is formed between the first dielectric slab waveguide 10 and the second dielectric slab waveguide 20 so as to connect optically the first dielectric slab waveguide 10 with the second dielectric slab waveguide 20. The Junction of the first dielectric slab waveguide 10 and the third dielectric slab waveguide 30 forms a boundary A. The Junction of the second dielectric slab waveguide 20 and the third dielectric slab waveguide 30 forms a boundary B. The first dielectric slab waveguide 10, the second dielectric slab waveguide 20, and the third dielectric slab waveguide 30 have effective refractive indices $N_{10}$, $N_{20}$, and $N_{30}$, respectively.

The optical device 1 propagates light I having a free-space wavelength $\lambda$ in a single mode. The light I travels through the first dielectric slab waveguide 10 and is incident on the boundary A and the third dielectric slab waveguide 30 at an incident angle $\Theta$. A part of the light I travels from the first dielectric slab waveguide 10 into the second dielectric slab waveguide 20 without being scattered or reflected at either of the boundaries A or B and becomes light T in the second dielectric slab waveguide 20. The other part of the light I is reflected at the boundaries A or B, and becomes reflected light $R_A$ or $R_B$, respectively. Generation of the reflected light $R_A$ or $R_B$ indicates the existence of connection losses. The connection losses reduce connection efficiency as will be appreciated.

If the third dielectric slab waveguide 30 works as an antireflection film when the light I travels from the first dielectric slab waveguide 10 to the second dielectric slab waveguide 20, the reflected light $R_A$ or $R_B$ can be prevented. The third dielectric slab waveguide 30 functions as an antireflection film if the following Equations (1) and (2) are satisfied or substantially satisfied:

$$N_{30} = \sqrt{N_{10}N_{20}} \quad (1)$$

$$l_{30} = \frac{\lambda}{\sqrt[4]{N_{30}^2 - N_{10}^2\sin^2\theta}} \quad (2)$$

where $l_{30}$ is the length of the third dielectric slab waveguide 30, as is shown in FIG. 1A.

When the third dielectric slab waveguide 30 satisfies the Equations (1) and (2), the reflected light $R_A$ and $R_B$ substantially become zero because of 180 degrees phase shift between the reflected light $R_A$ and $R_B$, and the light I. Therefore, all of the light I is transmitted from the first dielectric slab waveguide 10 into the second dielectric slab waveguide 20 and becomes the light T. Thus, the two dielectric slab waveguides 10 and 20 are connected with each other without connection loss.

Figure 1B:
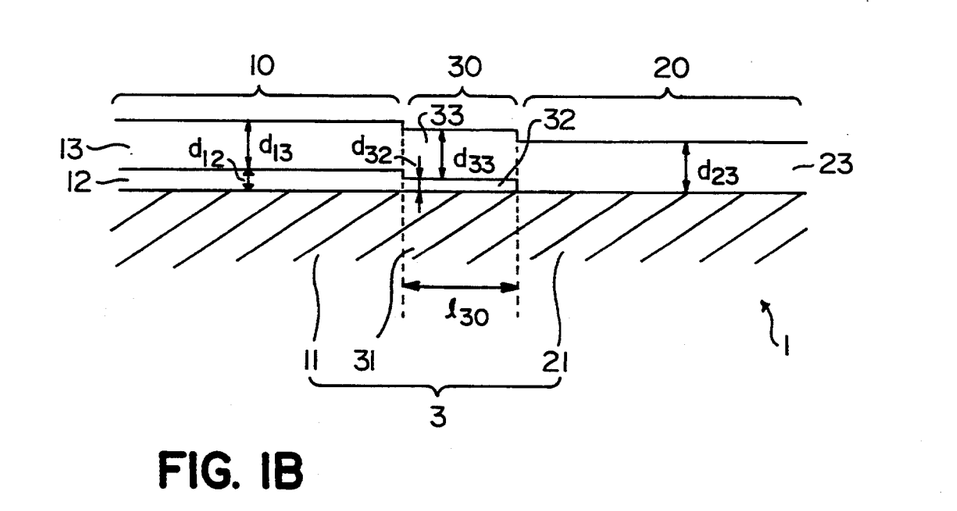
FIG. 1B is a schematic cross sectional view of the optical device in Example 1 of the present invention.

Referring to FIG. 1B, the optical device 1 is now explained in detail.

FIG. 1B shows a schematic cross sectional view of the optical device 1 according to a preferred embodiment of the present invention. A dielectric substrate 3 made of silicon dioxide (refractive index: 1.458) is divided into a first region 11, a second region 21, and a third region 31. The second region 21 is offset from the first region 11 by a length $l_{30}$. A first dielectric slab waveguide 10, a second dielectric slab waveguide 20, and a third dielectric slab waveguide 30 include the first region 11, the second region 21, and the third region 31, respectively.

The optical device 1 includes the dielectric substrate 3, first dielectric layers 12 and 32 formed on the first region 11 and the third region 31, respectively, and second dielectric layers 13, 33, and 23 formed on the first dielectric layers 12 and 32 and on the second region 21, respectively. The first dielectric layers 12 and 32 have a thicknesses such that the thickness $d_{12}$ of the first dielectric layer 12 is different from the thickness $d_{32}$ of the first dielectric layer 32.

The first dielectric slab waveguide 10 includes the first dielectric layer 12 (thickness $d_{12}$: 50 nm) formed on the first region 11 and the second dielectric layer 13 (thickness $d_{13}$: 600 nm) formed on the first dielectric layer 12. The first dielectric layer 12 is made of titanium dioxide (refractive index: 2.3), and the second dielectric layer 13 is made of silicon dioxide (refractive index: 1.53).

The second dielectric slab waveguide 20 includes the second dielectric layer 23 (thickness $d_{23}$: 600 nm) formed on the second region 21. The second dielectric layer 23 is made of silicon dioxide (refractive index: 1.53). When the optical device 1 provides for propagation of light having the free-space wavelength $\lambda$ equal to 780 nm in a single TM mode, an effective refractive index $N_{10}$ of the first dielectric slab waveguide 10 and an effective refractive index $N_{20}$ of the second dielectric slab waveguide 20 are determined based on the above-mentioned structure using conventional techniques. In this example, $N_{10}$ and $N_{20}$ are equal to 1.6019 and 1.4817, respectively.

An effective refractive index $N_{30}$ of the third dielectric slab waveguide 30 is calculated at 1.5406 according to the Equation (1). In order that the third dielectric slab waveguide 30 has the effective refractive index equal to the aforementioned calculated value, a first dielectric layer 32 (thickness $d_{32}$: 30 nm) is formed on the third region 31, and a second dielectric layer 33 (thickness $d_{33}$: 600 nm) is formed on the first dielectric layer 32. The first dielectric layer 32 is made of titanium dioxide (refractive index: 2.3), and the second dielectric layer 33 is made of silicon dioxide (refractive index: 1.53). Moreover, a length $l_{30}$ is set to be 126 run when the light I penetrates the third dielectric slab waveguide 30 at the incident angle $\theta = 0$.

As is described above, the light I traveling in the first dielectric slab waveguide 10 can be propagated into the second dielectric slab waveguide 20 without connection losses by forming the third dielectric slab waveguide 30 having the above-mentioned structure.

Figure 2A:
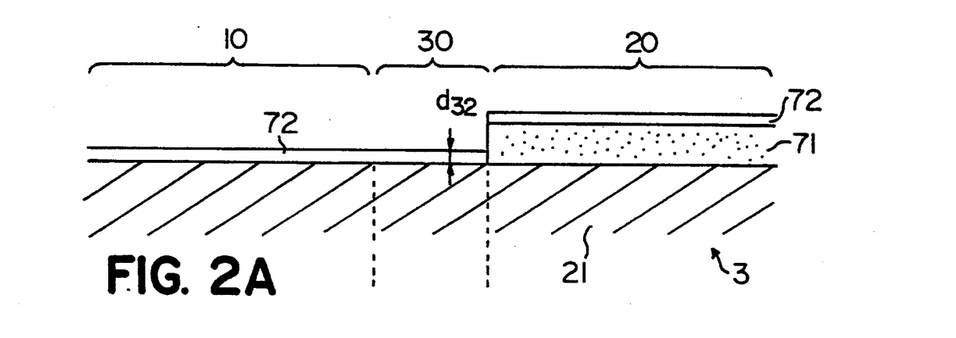
FIGS. 2A through 2C illustrate a method of producing the optical device shown in FIG. 1B.

Referring to FIGS. 2A through 2C, a method of producing the optical device 1 is explained. As is shown in FIG. 2A, a resist pattern 71 is formed on a second region 21 of a dielectric substrate 3 (refractive index: 1.458) made of silicon dioxide. A titanium dioxide film 72 (refractive index: 2.3, thickness $d_{32}$: 30 nm) is deposited on the dielectric substrate 3 and the resist pattern 71 by a sputter method. The second region 21 constitutes a part of a second dielectric slab waveguide 20.

Figure 2B:
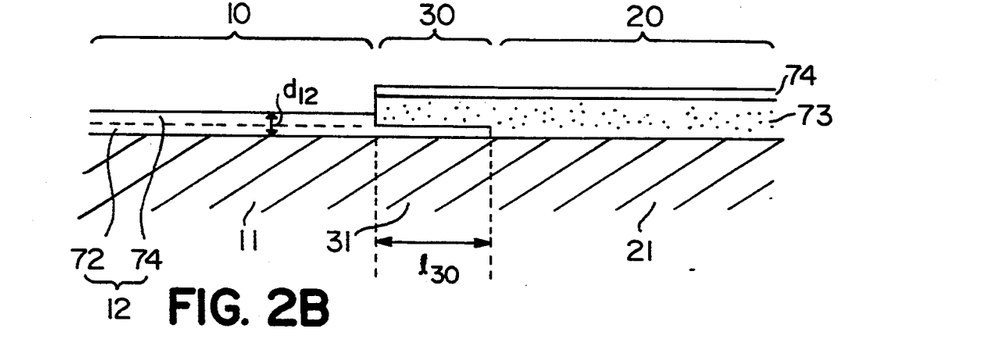

After the resist pattern 71 is removed by a lift-off method, a resist pattern 73 is formed on a part of the titanium dioxide film 72 and the second region 21 (shown in FIG. 2B). The part of the titanium dioxide film 72 is positioned above a third region 31 of the dielectric substrate 3. The other part of the titanium dioxide film 72 is positioned above a first region 11 of the dielectric substrate 3. The second region 21 is positioned away from the first region 11 by a length $l_{30}$. In this example, the length $l_{30}$ is set to be 126 nm. The third region 31 is defined as a region between the first region 11 and the second region 21.

Figure 2C:
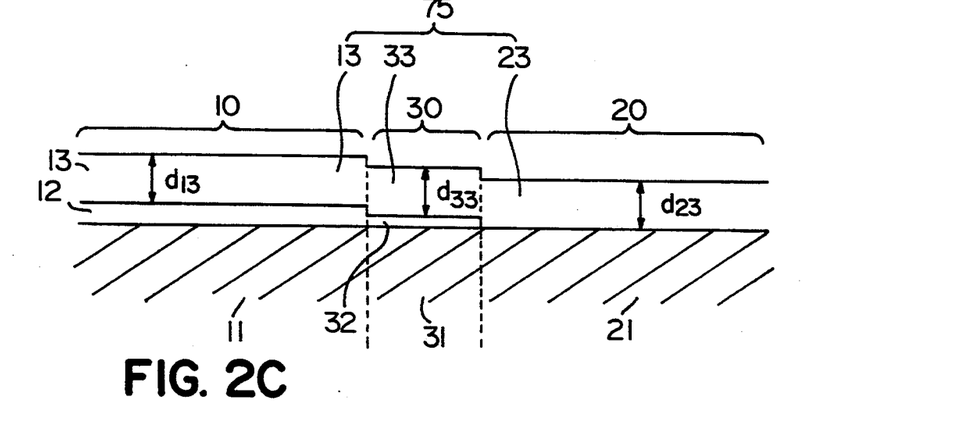

A titanium dioxide film 74 is deposited on the other part of the titanium dioxide film 72 and the resist pattern 73 by a sputter method. A total thickness $d_{12}$ of the titanium oxide films 72 and 74 is set to be 50 nm. Then, the resist pattern 73 is removed by a lift-off method. As is shown in FIGS. 2B and 2C, the titanium dioxide films 72 and 74 formed by the aforementioned process form first dielectric layers 12 and 32. The first dielectric layers 12 and 32 can be regarded as a first dielectric layer which is formed on the first region 11 and the third region 31, respectively, and have a thickness $d_{12}$ above the first region 11 and a thickness $d_{32}$ above the third region 31.

A glass film 75 (refractive index: 1.53, thickness: 600 nm) is deposited on the second region 21 and the first dielectric layers 12 and 32. The glass film 75 is formed by a sputter method with a #7059 target commercially available from Corning Company. The glass film 75 becomes second dielectric layers 13, 23, and 33. Thicknesses $d_{13}$, $d_{23}$, and $d_{33}$ are the same because the second dielectric layers 13, 23, and 33 are simultaneously formed. Also, the second dielectric layers 13, 23, and 33 can be regarded as a second dielectric layer formed on the first dielectric layers 12 and 32 and the second region 21.

EXAMPLE 2

Figure 3A:
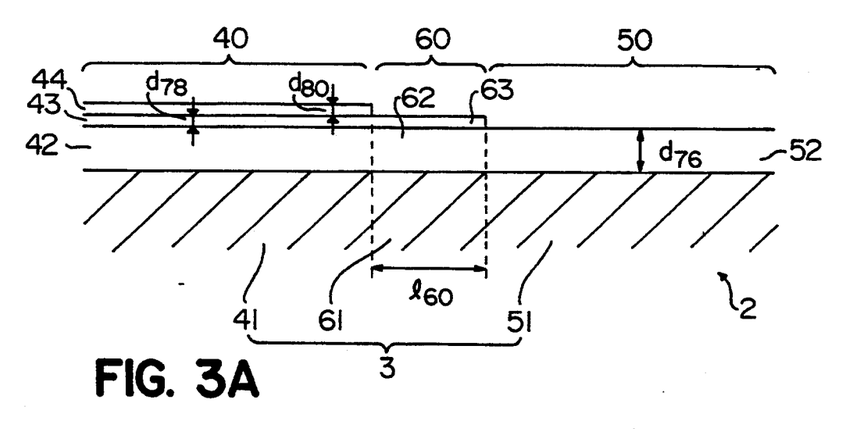
FIG. 3A is a schematic cross sectional view of the optical device in Example 2 of the present invention.

FIG. 3A shows a schematic cross sectional view of an optical device 2 according to the present invention. A dielectric substrate 3 made of silicon dioxide (refractive index: 1.458) is divided into a first region 41, a second region 51, and a third region 61. The second region 51 is offset from the first region 41 by a length $l_{60}$. A first dielectric slab waveguide 40, a second dielectric slab waveguide 50, and a third dielectric slab waveguide 60 include the first region 41, the second region 51, and the third region 61, respectively. The optical device 2 includes the dielectric substrate 3, first dielectric layers 42, 52, and 62 respectively formed on the first region 41, the second region 51, and the third region 61. The optical device 2 further includes second dielectric layers 43 and 63 respectively formed on the first dielectric layers 42 and 62, and a third dielectric layer 44 formed on the second dielectric layer 43.

The first dielectric slab waveguide 40 includes the first dielectric layer 42 (thickness $d_{76}$: 50 nm) formed on the first region 41 and the second dielectric layer 43 (thickness $d_{78}$: 67 nm) formed on the first dielectric layer 42. The first dielectric layer 42 is made of silicon dioxide (refractive index: 1.53), and the second dielectric layer 43 is made of tantalum(V) oxide (refractive index: 2.0).

The second dielectric slab waveguide 50 includes the first dielectric layer 52 (thickness $d_{76}$: 550 nm) formed on the second region 51. The first dielectric layer 52 is made of silicon dioxide (refractive index: 1.53). When the optical device 2 provides for propagation of light having a free-space wavelength λ equal to 780 nm in a single TM mode, an effective refractive index $N_{40}$ of the first dielectric slab waveguide 40 and an effective refractive index $N_{50}$ of the second dielectric slab waveguide 50 are determined based on the above-mentioned structure using conventional techniques. In this example, $N_{40}$ and $N_{50}$ are equal to 1.4857 and 1.5436, respectively.

As is explained in Example 1, if the third dielectric slab waveguide 60 works as an antireflection film, the first dielectric slab waveguide 40 and the second dielectric slab waveguide 50 can be connected with each other without connection losses. Therefore, the third dielectric slab waveguide 60 is formed such that the Equations (3) and (4) are substantially satisfied.

$$N_{60} = \sqrt{N_{40}N_{50}} \quad (3)$$

$$l_{60} = \frac{\lambda}{\sqrt[4]{N_{60}^2 - N_{40}^2\sin^2\theta}} \quad (4)$$

Where $l_{60}$ is the length of the third dielectric slab waveguide 60.

When the third dielectric slab waveguide 60 satisfies the Equations (3) and (4), all of the light I becomes the light T, and two dielectric slab waveguides 40 and 50 can be connected with each other without connection losses.

Figure 3B:
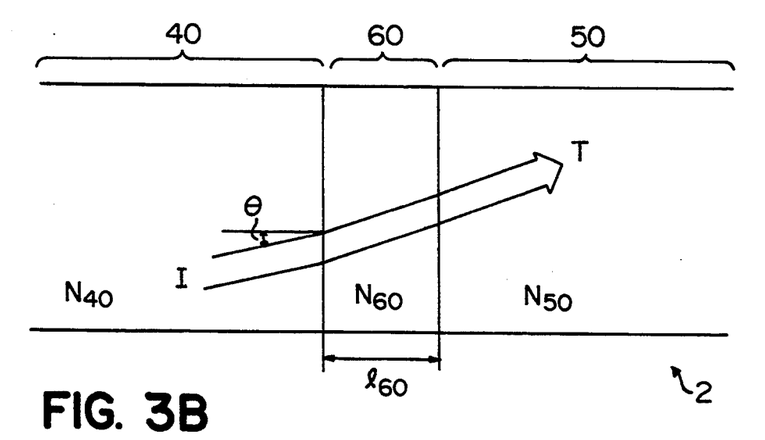
FIG. 3B is a schematic representation of a light path in an optical device in accordance with Example 2 of the present invention.

An effective refractive index $N_{60}$ of the third dielectric slab waveguide 60 is calculated at 1.5144 according to the Equation (3). In order that the third dielectric slab waveguide 60 has the effective refractive index equal to the aforementioned calculated value, a first dielectric layer 62 (thickness $d_{76}$: 550 nm) is formed on the third region 61, and a second dielectric layer 63 (thickness $d_{78}$: 67 nm) is formed on the first dielectric layer 62. The first dielectric layer 62 is made of silicon dioxide (refractive index: 1.53), and the second dielectric layer 63 is made of tantalum(V) oxide (refractive index: 2.0). Moreover, the length $l_{60}$ set to be 129 nm when the light I penetrates the third dielectric slab waveguide 60 at the incident angle λ=0, as is shown in FIG. 3B.

As is described above, the light I traveling in the first dielectric slab wave,aide 40 can be propagated into the second dielectric slab waveguide 50 without connection losses by forming the third dielectric slab waveguide 60 having the above-mentioned structure.

Hereinafter, referring FIGS. 4A through 4C, a method of producing the optical device 2 is explained.

Figure 4A:
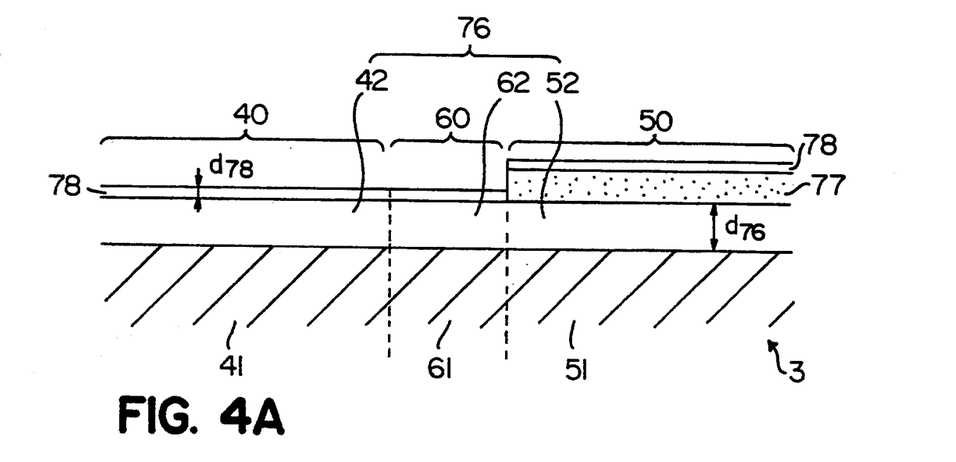
FIGS. 4A through 4C illustrate a method of producing the optical device shown in FIG. 3A.
Figure 4B:
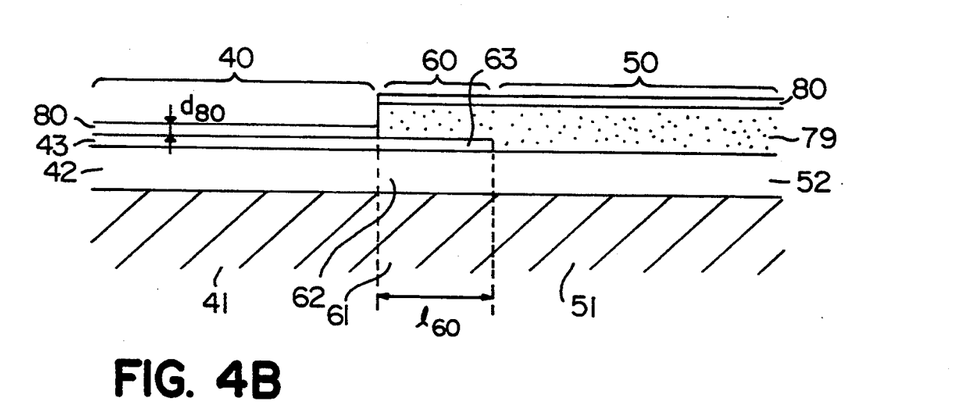
Figure 4C:
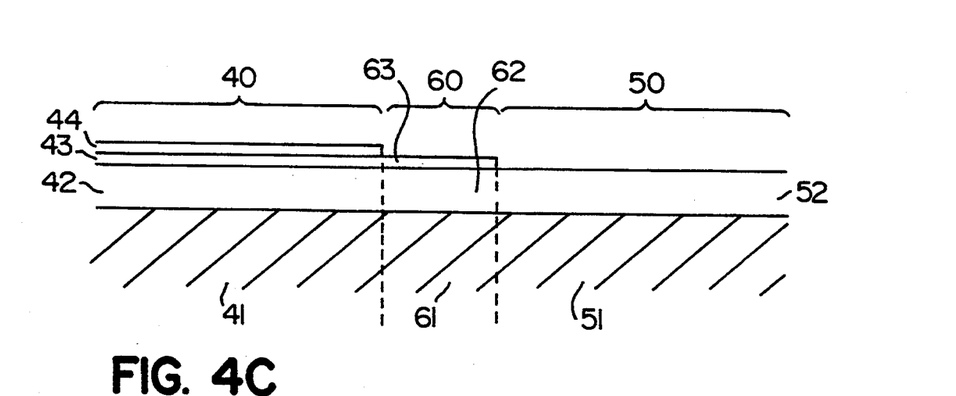

As is shown in FIG. 4A, a glass film 76 (refractive index: 1.53, thickness $d_{76}$: 550 nm) is deposited on a dielectric substrate 3. The glass film 76 is made of silicon dioxide and is formed by a sputter method with #7059 target commercially available from Corning Company. The dielectric substrate 3 includes a second region 51 which will constitute a part of the second dielectric slab waveguide 50 shown in FIG. 4C. A part of the glass film 76 on the second region 51 becomes a first dielectric layer 52. The other part of the glass film 76 becomes first dielectric layers 42 and 62 on the first region 41 and the third region 61, respectively. A resist pattern 77 is formed on the first dielectric layer 52.

A tantalum oxide film 78 (refractive index: 2.0, thickness $d_{78}$: 67 nm) is then deposited on the resist pattern 77 and the first dielectric layers 42 and 62. The tantalum oxide film 78 is made of tantalum(V) oxide. The first dielectric layers 42 and 62 are positioned above a first region 41 and a third region 61 of the dielectric substrate 3, respectively. The second region 51 is offset from the first region 41 by a length $l_{60}$. In this example, the length $l_{60}$ (FIG. 4B) is set to be 129 nm. The third region 61 is defined by a region between the first region 41 and the second region 51. Then, the resist pattern 77 is removed by a lift-off method. As is shown in FIG. 4B, a part of the tantalum oxide film 78 positioned above the first dielectric layer 62 forms a second dielectric layer 63. The other part of the tantalum oxide film 78 positioned above the first dielectric layer 42 forms a second dielectric layer 43.

A resist pattern 79 is formed on the first dielectric layer 52 and the second dielectric layer 63. A tantalum oxide film 80 (refractive index: 2.0, thickness $d_{80}$: 23 nm) is deposited on the resist pattern 79 and the second dielectric layer 43. The tantalum oxide film 78 is made of tantalum(V) oxide. The resist pattern 79 is removed by a lift-off method. The tantalum oxide film 80 becomes a third dielectric layer 44.

As is explained in the above Examples 1 and 2, in the optical device of the present invention, two dielectric slab waveguides having different effective refractive indices can be connected without any tapered layers. The third dielectric slab waveguide to connect the two dielectric slab waveguide can be formed easily by conventional techniques, for example, a lift-off method, engaged in semiconductor manufacturing process. Therefore, the optical device of the present invention can be produced with good productivity and production yield.

The optical device of the present invention can be applied to various kind of optic devices including optoelectronic integrated circuits. When light consisting of two different polarized lights enter into the optical device of the present invention, only one polarized light can be transmitted by selecting an appropriate incident angle. Thus, the optical device of the present invention can be applied to a polarizing isolator.

In the Examples 1 and 2, some exemplary values for indices of reflection and other dimensions are mentioned. It will be appreciated that other values which will enable operation of the invention described may be used. Also, the first, second, and third dielectric slab waveguides may include a number of dielectric layers other than that mentioned above. Other materials for dielectric layers may be used according to the wavelength of the light traveling in the optical device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical device, comprising:
   a first dielectric slab waveguide having an effective refractive index $N_1$;
   a second dielectric slab waveguide having an effective refractive index $N_2$; and
   a third dielectric slab waveguide having a length $l$ and an effective refractive index $N_3$, said third dielectric slab waveguide being formed between said first dielectric slab waveguide and said second dielectric slab waveguide so as to connect said first dielectric slab waveguide with said second dielectric slab waveguides optically;
   wherein said length $l$ and said effective refractive index $N_3$ substantially satisfy following equations;

$$N_3 = \sqrt{N_1 N_2}$$

$$l = \frac{\lambda}{4\sqrt{N_3^2 - N_1^2 \sin^2\theta}}$$

where $\lambda$ is a free-space wavelength of light traveling in maid optical device and said light travels from said first dielectric slab waveguide to said third dielectric slab waveguide at an incident angle $\theta$ in a single mode.

2. An optical device of claim 1, said optical device further comprising a dielectric substrate:
   wherein said first dielectric slab waveguide includes a first region of said dielectric substrate;
   said second dielectric slab waveguide includes a second region of said dielectric substrate, said second region being offset from said first region by said length $l$; and
   said third dielectric slab waveguide includes a third region of said dielectric substrate, said third region being formed between said first region and said second region.

3. An Optical device of claim 2, said optical device further comprising:
   a first dielectric layer formed on said first region and said third region, said first dielectric layer having a thickness such that a thickness of said first dielectric layer on said third region is different from a that on said first region; and
   a second dielectric layer formed on said first dielectric layer and said second region.

4. An optical device of claim 2, said optical device further comprising:
   a first dielectric layer formed on said first region, said second region, and said third region;
   a second dielectric layer formed on a part of said first dielectric layer, said part of said first dielectric layer being positioned on said first region and said third region; and
   a third dielectric layer formed on a part of said second dielectric layer, said part of said second dielectric layer being positioned above said first region.

5. A method for producing an optical device, said method comprising the steps of:
   forming a first dielectric slab waveguide having an effective refractive index $N_1$;
   forming a second dielectric slab waveguide having an effective refractive index $N_2$; and
   forming a third dielectric slab waveguide having a length $l$ and an effective refractive index $N_3$, said third dielectric slab waveguide being formed between said first dielectric slab waveguide and said second dielectric slab waveguide so as to connect said first dielectric slab waveguide with said second dielectric slab waveguides optically;
   wherein said length $l$ and said effective refractive index $N_3$ substantially satisfy following equations;

$$N_3 = \sqrt{N_1 N_2}$$

$$l = \frac{\lambda}{4\sqrt{N_3^2 - N_1^2 \sin^2\theta}}$$

where $\lambda$ is a free-space wavelength of light traveling in said optical device and said light travels from said first dielectric slab waveguide to said third dielectric slab waveguide at an incident angle $\Theta$ in a single mode.

* * * * *

UNITED STATES PATENT AND TRADEMARK OFFICE
CERTIFICATE OF CORRECTION

PATENT NO. : 5,410,623

Issue Date : April 25, 1995

INVENTOR(S) : Konji Minami et al.

It is certified that error appears in the above-identified patent and that said Letters Patent is hereby corrected as shown below:

In the Abstract:
After line 11, the second equation:

$$" \quad l = \frac{\lambda}{\sqrt[4]{N_3^2 - N_1^2 \sin^2 \theta}} \quad "$$

*should read*

$$-- \quad l = \frac{\lambda}{4 * \sqrt{N_3^2 - N_1^2 \sin^2 \theta}} \quad --;$$

column 3, before line 15:

$$" \quad l = \frac{\lambda}{\sqrt[4]{N_3^2 - N_1^2 \sin^2 \theta}} \quad "$$

*should read*

$$-- \quad l = \frac{\lambda}{4 * \sqrt{N_3^2 - N_1^2 \sin^2 \theta}} \quad --;$$

UNITED STATES PATENT AND TRADEMARK OFFICE
CERTIFICATE OF CORRECTION

PATENT NO. : 5,410,623

Issue Date : April 25, 1995

INVENTOR(S) : Konji Minami et al.

It is certified that error appears in the above-identified patent and that said Letters Patent is hereby corrected as shown below:

column 3, before line 43:

$$"\quad l = \frac{\lambda}{\sqrt[4]{N_3^2 - N_1^2 \sin^2\theta}} \quad"$$

should read $$-- \quad l = \frac{\lambda}{4 * \sqrt{N_3^2 - N_1^2 \sin^2\theta}} \quad --;$$

column 5, before line 19:

$$"\quad l = \frac{\lambda}{\sqrt[4]{N_3^2 - N_1^2 \sin^2\theta}} \quad"$$

should read $$-- \quad l = \frac{\lambda}{4 * \sqrt{N_3^2 - N_1^2 \sin^2\theta}} \quad --;$$

UNITED STATES PATENT AND TRADEMARK OFFICE

CERTIFICATE OF CORRECTION

PATENT NO. : 5,410,623

Issue Date : April 25, 1995

INVENTOR(S) : Konji Minami et al.

It is certified that error appears in the above-identified patent and that said Letters Patent is hereby corrected as shown below:

column 7, before line 58:

$$" \quad l = \frac{\lambda}{\sqrt[4]{N_3^2 - N_1^2 \sin^2\theta}} \quad "$$

*should read*

$$-- \quad l = \frac{\lambda}{4 * \sqrt{N_3^2 - N_1^2 \sin^2\theta}} \quad --;$$

column 9, before line 48;

$$" \quad l = \frac{\lambda}{\sqrt[4]{N_3^2 - N_1^2 \sin^2\theta}} \quad "$$

*should read*

$$-- \quad l = \frac{\lambda}{4 * \sqrt{N_3^2 - N_1^2 \sin^2\theta}} \quad --;$$

column 9, line 49: "maid" should read --said--;

UNITED STATES PATENT AND TRADEMARK OFFICE
CERTIFICATE OF CORRECTION

PATENT NO. : 5,410,623

Issue Date : April 25, 1995

INVENTOR(S) : Konji Minami et al.

It is certified that error appears in the above-identified patent and that said Letters Patent is hereby corrected as shown below:

column 10, before line 52:

$$"\ \ l = \frac{\lambda}{\sqrt[4]{N_3^2 - N_1^2 \sin^2\theta}}\ \ "$$

should read $$--\ \ l = \frac{\lambda}{4 * \sqrt{N_3^2 - N_1^2 \sin^2\theta}}\ \ --.$$

Signed and Sealed this

Twenty-sixth Day of September, 1995

Attest:

BRUCE LEHMAN

*Attesting Officer*         *Commissioner of Patents and Trademarks*

UNITED STATES PATENT AND TRADEMARK OFFICE
CERTIFICATE OF CORRECTION

PATENT NO. : 5,410,623
DATED : April 25, 1995
INVENTOR(S) : Konji Minami, et al.

It is certified that error appears in the above-indentified patent and that said Letters Patent is hereby corrected as shown below:

column 5, before line 19:

" $l_{30} = \dfrac{\lambda}{\sqrt[4]{N_{30}^2 - N_{10}^2 \sin^2\theta}}$ "

should read

-- $l_{30} = \dfrac{\lambda}{4 \cdot \sqrt{N_{30}^2 - N_{10}^2 \sin^2\theta}}$ --;

column 7, before line 58:

" $l_{60} = \dfrac{\lambda}{\sqrt[4]{N_{60}^2 - N_{40}^2 \sin^2\theta}}$ "

should read

-- $l_{60} = \dfrac{\lambda}{4 \cdot \sqrt{N_{60}^2 - N_{40}^2 \sin^2\theta}}$ --;

Signed and Sealed this

Thirtieth Day of January, 1996

Attest:

BRUCE LEHMAN

Attesting Officer

Commissioner of Patents and Trademarks